(12) United States Patent
Wittig

(10) Patent No.: US 9,602,987 B1
(45) Date of Patent: Mar. 21, 2017

(54) SHORT TEXT MESSAGING IN DIGITAL MOBILE TELECOMMUNICATION NETWORKS

(71) Applicant: SAP SE, Walldorf (DE)

(72) Inventor: Frank Wittig, Spiesen-Elversberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/956,931

(22) Filed: Dec. 2, 2015

(30) Foreign Application Priority Data

Sep. 21, 2015 (EP) ...................................... 15186061

(51) Int. Cl.
*H04W 4/00* (2009.01)
*H04W 4/14* (2009.01)

(52) U.S. Cl.
CPC .................................... *H04W 4/14* (2013.01)

(58) Field of Classification Search
CPC ......... G06F 17/30294; G06F 17/30572; G06F 2217/16; G06F 2217/74; G06F 17/30598; G06F 17/2217; G06F 17/2705; G06F 17/2735; G06F 17/2755; G06F 17/30011; H04W 4/00; H04W 12/08
USPC .............................................. 455/414.1–417
See application file for complete search history.

(56) References Cited

U.S. PATENT DOCUMENTS

| | | | |
|---|---|---|---|
| 2008/0005651 A1* | 1/2008 | Grefenstette | ....... G06F 17/3061 715/234 |
| 2010/0231364 A1 | 9/2010 | Laine et al. | |
| 2013/0288722 A1* | 10/2013 | Ramanujam | ............ H04W 4/14 455/466 |

* cited by examiner

*Primary Examiner* — Ronald Eisner
(74) *Attorney, Agent, or Firm* — Richardt Patentanwalte PartG m

(57) ABSTRACT

A digital mobile telecommunications method using a digital telecommunications system. The method comprises: requesting the message from the content provider by the telecommunications device; receiving the message by the telecommunications device via the digital mobile telecommunications network from a content provider; sending the message to a text classification system by the telecommunications device via the wired digital network and the digital mobile telecommunications network; creating text tokens from the text portion using a tokenizing algorithm by the text classification system; transforming the text tokens into stemmed tokens using a stemming algorithm by the text classification system; determining a word classifier for each of the stemmed tokens using a named entity recognition algorithm by the text classification system; calculating a message classification of the message using a classification algorithm by the text classification system, wherein the classification algorithm uses the stemmed tokens and the word classifier for each of the stemmed tokens as input; sending the message classification to the telecommunications device by the text classification system via the wired network and the digital mobile telecommunications network; and displaying the message on the screen, wherein the display of the message is modified according to the classification.

18 Claims, 7 Drawing Sheets

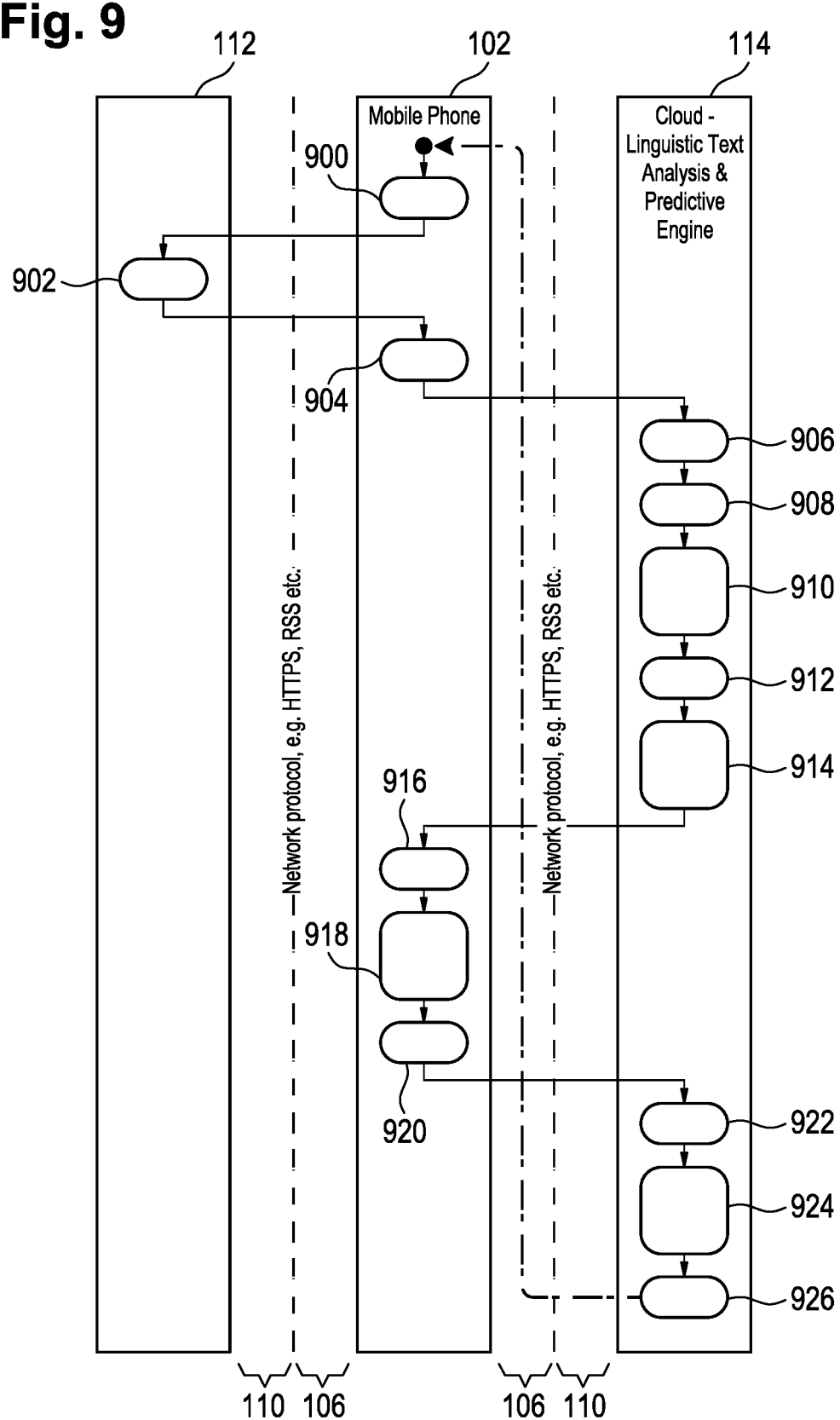

SHORT TEXT MESSAGING IN DIGITAL MOBILE TELECOMMUNICATION NETWORKS

FIELD OF THE INVENTION

The invention relates to digital mobile telephony, in particular to reducing the processing power required for text messaging in digital mobile telephony.

BACKGROUND AND RELATED ART

Often times there is only a short text in a kind of preview available in long lists, such as titles and/or abstracts with links to the full document. A typical scenario are feeds of various types, such as emergency messages, traffic reports, or weather reports. Displaying a large number of short texts may be disadvantageous on a mobile device such as a smart phone. The limited screen size may require scrolling through a list and may consume energy refreshing the display.

There are situations where even lists of unstructured information in the form of short texts are a burden for the user to scan through in order to decide which of them are really relevant with respect to some particular criterion, e.g. interest, topic, urgency, or etc. For example, when travelling and using mobile phones between several appointments it is crucial for the user to immediately focus only on the relevant information. In other situations emergency messages may be sent automatically to the user of a mobile device. It may be beneficial to have a notification system for the receipt of such short or SMS messages.

U.S. Pat. No. 5,923,659 A describes a system and method for controlling on a worldwide basis two or more telecommunications networks which are themselves capable of exercising a form of common channel signaling network control. The system uses an architecture in which a destination telecommunications network having common channel signaling control is connected to an originating telecommunications network having common signaling control through a call set up and control methodology which provides ad hoc connection between the two spaced telecommunication networks and common channel signaling networks via an unrelated world wide data network which preferably constitutes the Internet.

U.S. Pat. No. 6,233,445 B1 describes a method of establishing emergency calls within a mobile telecommunications network.

SUMMARY

The invention provides for a method and a digital telecommunication system in the independent claims. Embodiments are given in the dependent claims.

In one aspect the invention provides for a digital mobile telecommunication method using a digital telecommunication system. The digital telecommunication system comprises a telecommunications device. The telecommunications device comprises a graphical display. The digital telecommunication system further comprises a digital mobile telecommunications network. The telecommunications device is configured for connecting to the digital mobile telecommunications network. The digital telecommunication system further comprises a wired digital network. The wired digital network is connected to the digital mobile telecommunications network. As they are connected the telecommunications device can exchange information or data with devices connected to the wired digital network via the digital mobile telecommunications network.

The digital telecommunication system further comprises a content provider. The wired digital network is connected to the content provider. The content provider is configured for providing a message. The message comprises at least a text portion. The message may take different forms. In some examples the message may be an email message. In other examples the message may for instance be a warning message, a traffic report, or a weather report.

The digital telecommunication system further comprises a text classification system. The text classification system is connected to the wired digital network. The content provider and/or the text classification system may for example be implemented by servers and/or database management systems.

The method comprises requesting the message from the content provider via the telecommunications device. This for example may entail the telecommunications device sending the request via the digital mobile telecommunications network and the wired digital network to the content provider. The method further comprises sending the message to the telecommunications device by the content provider via the wired digital network and the digital mobile telecommunications network. The method further comprises receiving the message by the telecommunications device via the digital mobile telecommunications network. The method further comprises sending the message to the text classification system by the telecommunications device via the wired digital network and the digital mobile telecommunications network.

The method further comprises receiving the message by the text classification system via the wired digital network. The method further comprises creating text tokens from the text portion using a tokenizing algorithm by the text classification system. In the tokenizing process the tokenizing algorithm breaks the text down into individual words. The method further comprises transforming the text tokens into stemmed tokens using a stemming algorithm by the text classification system. In this step the stemming algorithm transforms the text tokens into a standard format for processing. For example verbs may have different tenses or nouns may be plural or transformed into other parts of speech. The tokenizing process puts the words in a standard format.

The method further comprises determining a word classifier for each of the stemmed tokens using a named entity recognition algorithm by the text classification system. In this step an classifier or Meta data is assigned to each of the stemmed tokens. The named entity recognition may be a anlgorith that classifies the stemmed tokens according to names of persons, names of objects or things, organizations, location, expressions of times, indicates a quantity, describes a monetary worth or value, or other properties or contexts. Named entity recognition may also be referred to as entity identification, entity chunking and entity extraction.

The word classifier may be used to provide or identify an entity or a classification for the stemmed tokens. In some cases the same classifier may be used for different stemmed tokens. For example 'France' and 'Germany' are both countries. In this example selecting a word classifier of 'Country' may be appropriate for both.

In another embodiment the method further comprises calculating a message classification of the message using a classification algorithm by the text classification system. The classification algorithm uses the stemmed tokens and the word classifier for each of the stemmed tokens as input.

For example the stemmed tokens and their classifiers can be reformed into an input vector that is used by a pattern recognition algorithm. The method further comprises sending the message classification to the telecommunications device by the text classification system via the wired network and the digital mobile telecommunications network. The method further comprises receiving the message classification by the telecommunications device via the digital mobile telecommunications network.

The method further comprises displaying the message on the screen. The displayed message is modified according to the classification. This embodiment may have the advantage that the modification of the message on the screen is performed automatically with using a minimal amount of processing by the telecommunications device. For example complicated text and digital classification algorithms are run by the text classification system and not by the telecommunications device. This may reduce the amount of computing power that is necessary and may also reduce the amount of energy used by the telecommunications device.

This may also enable the use of more complex databases or data sets to be used for the named entity recognition. A single text classification system can be used for may different telecommunications devices. It may be unpractical to place a large database and text processing system on many telecommunications devices. For example a handcrafted list of terms and/or database may be used to perform the named entity recognition. This can then be reused for many telecommunications devices. This may reduce the computational burden and power expended by individual and groups of telecommunications devices.

In some examples the classification may cause the message to not be displayed on the screen. For example the message may be deleted or placed into a queue or other storage for display later.

In other examples the message may be classified as an emergency message. For example there may be an automated system to send emergency SMS or other short messages to users of telecommunications devices within a certain geographic region. The message could be classified as an emergency message so that it brought to the immediate attention to a user of the mobile telephone device. The messages could example could be sent out on the basis of which cell or mobile telephone towers or base stations are being used. The messages could then be displayed prominently on the screen or an actuator such as a speaker or vibrator could be used to alert the user of the arrival of the emergency message.

In other examples the message may be classified as an emergency message. In this example the message classification may indicate a emergency situation that the user needs to respond or be informed of immediately. For example the classification algorithm may identify specific word and word classifier combinations that indicate an emergency situation. This may then be used to trigger a response to the emergency message.

For example the telecommunications device may be handheld and may be battery powered. Embodiments of the invention may reduce the battery power consumption by the telecommunications device.

In another embodiment, the message classification includes the message and the text portion. This may be beneficial because the message and the classification do not need to be paired later.

In another embodiment, the classification of the message may identify the message as being of a first type or a second type. This may have the advantage of classifying messages into two groups which can be displayed differently.

In another embodiment, the classification may be numerical. This may be beneficial because it may provide for a means of continuously modifying the way the message is displayed on the screen.

In another embodiment, the classification may be one of a predetermined number of categories. This may have the benefit of providing a discreet set of means of displaying the message on the screen.

In another embodiment, the named entity recognition algorithm is a statistical classifier. In this embodiment the other words in the text portion are used to determine the word classifiers for each stemmed word using a statistical model. This may be beneficial because it may provide a means of providing the word classifier with a minimum amount of training or initial input.

In another embodiment, the named entity recognition algorithm is a list-based recognition system. This embodiment may have the benefit of providing a compact yet accurate means of providing the word classifier.

In another embodiment, the named entity recognition algorithm may be a grammar-based system which uses the context of the other words to identify the word classifier. This may have the benefit of providing a more accurate word classifier.

In another embodiment, the named entity recognition algorithm is a combination of one or more of the previously named embodiments.

In another embodiment, the text classification system is a database system. For example the existing database system may have some sort of engine for processing text. This may have the benefit of repurposing the text classification system of a database system for reducing the load of computing on a telecommunications device.

In another embodiment, the classification algorithm is a naive Bayesian classifier. The use of a naive Bayesian classifier may be useful particularly if the text portion is short. In naive Bayesian classifiers there is no assumed correlation between the individual words. The words in the text portion however may be part of a phrase or statement. This of course implies that there is a connection between the words. However, for a short text the correlation between the individual words is less important and the word classifier implicitly provides a correlation between the different stemmed tokens.

In another embodiment, the classification algorithm is a neural network. The neural network may be useful because it may be able to be trained to accurately assign the message classification.

In another embodiment, the method further comprises displaying the message on the graphical display for a display duration determined by the classification. This embodiment may be beneficial because it provides a means of modifying the display of the message according to the classification. For example if a message receives one classification it may be displayed for a duration longer than the other. This may have the effect of reducing the computational requirements for displaying the message and may also reduce the amount of battery power used for displaying the messages on a digital mobile telecommunications device.

In another embodiment, the method further comprises displaying the message on the graphical display for a first duration if the message classification is of a first type. The method further comprises displaying the message on the graphical display for a second duration if the message classification is the second type. The second duration is longer than the first duration. This embodiment may have the benefit of reducing the amount of computational and battery time for displaying messages of the first type.

In another embodiment, the method further comprises displaying the message on the graphical display using a font. The font has a size determined by the classification. In this embodiment some messages will be displayed using a larger font than other messages. This may have the effect of reducing the overall battery consumption and/or computational power required by the telecommunications device for displaying messages.

In another embodiment, the method further comprises displaying the message on a graphical display using a first font if the message classification is of a first type. The method further comprises displaying the message on the graphical display using a second font if the message classification is of the second type. The second font is larger than the first font. In this embodiment, the method may have the advantage that the overall use of power and computational power by the telecommunications device may be reduced.

In another embodiment, the graphical display has a center. The method further comprises displaying the message on the graphical display a selected distance from the center. The selected distance may be determined by the message classification. When a user is using the digital mobile telecommunications device they will typically stare at the center of the screen. By placing a message of more importance near the center the user of the device may unconsciously react more to the message nearer the center. The eyes of the user also have a larger number of rods and cones in the retina for processing data where the subject is focusing. This may also contribute to the subject noticing or reading messages close to the center subconsciously.

In another embodiment, the graphical display has a center. The method further comprises displaying the message on the graphical display using a first distance from the center if the message classification is the first type. The method further comprises displaying the message on the graphical display a second distance from the center of the message if the classification is the second type. The second distance is shorter than the first distance. The advantages of this embodiment have been previously discussed.

In another embodiment, the method further comprises displaying a user interface object on the graphical display. The graphical display is configured for being manipulated to indicate a user selected message classification. The method further comprises receiving the user selected message classification from the graphical display. The method further comprises sending the user selected message classification by the telecommunications device to the text classification system via the digital mobile telecommunications network and the wired network. The method further comprises receiving the user selected message classification by the text classification system via the wired network. The method further comprises training the classification algorithm by the text classification system using the text portion and the user selected message classification. This embodiment may be beneficial because it may provide a means of effectively training the classification algorithm for a particular user.

In another embodiment, the text portion is less than two sentences. Having the text portion less than two sentences may be beneficial because the existing text classification systems do not provide a means of classifying short texts. This may have the benefit of providing means of reducing the computing power required by and/or power consumed by the telecommunications device.

In another embodiment, the text portion is less than ten words. Having the text portion less than ten words may be beneficial because the existing text classification systems do not provide a means of classifying short texts. This may have the benefit of providing means of reducing the computing power required by and/or power consumed by the telecommunications device.

In another embodiment, the text portion is less than 40 words. Having the text portion less than 40 words may be beneficial because the existing text classification systems do not provide a means of classifying short texts. This may have the benefit of providing means of reducing the computing power required by and/or power consumed by the telecommunications device.

In another embodiment, the text portion is less than 20 words. Having the text portion less than 20 words may be beneficial because the existing text classification systems do not provide a means of classifying short texts. This may have the benefit of providing means of reducing the computing power required by and/or power consumed by the telecommunications device.

In another embodiment, the text portion is less than six sentences. Having the text portion less than six sentences may be beneficial because the existing text classification systems do not provide a means of classifying short texts. This may have the benefit of providing means of reducing the computing power required by and/or power consumed by the telecommunications device.

In another embodiment, the text portion is less than four sentences. Having the text portion less than four sentences be beneficial because the existing text classification systems do not provide a means of classifying short texts. This may have the benefit of providing means of reducing the computing power required by and/or power consumed by the telecommunications device.

In another embodiment the telecommunications device is configured for providing a sensory alert. The sensory alert is determined by the message classification. This may provide a means of alerting the user of a telecommunications device to the message classification without the user needing to look or read the display.

In another embodiment the sensory alert is any one of the following: an audible alert, a vibrating alert, a flashing alert on the graphical display and combinations thereof. The telecommunications device may for example provide a speaker, a vibrator, a flashing effect on the graphical display respectively to provide these effects. These may provide a means of alerting the user of a telecommunications device to the message classification without the user needing to look or read the display.

In another embodiment, the method further comprises requesting the message from the content provider by the telecommunications device. The message to the telecommunications device by the content provider is sent via the wired digital network and the digital mobile telecommunications network.

In another embodiment, the message is sent to the telecommunications device as an SMS message via a signaling layer of the digital mobile telecommunications network. The telecommunications device receives the SMS message using an SMS application. The SMS application could for example be computer executable code which is executed by a processor of the telecommunications device.

The message is sent to the text classification system via IP protocol via the digital mobile telecommunications network by the SMS application. The SMS application receives the SMS message via the signaling layer and then sends the message on the text classification system via an IP protocol. This could for example be done using the IP protocol of the digital mobile telecommunications network or via another network such as an available internet connection such as a WIFI network. The SMS message is displayed by the SMS application only after receiving the classification. In contrast to normal operation, the user of the phone is not alerted to the reception of the SMS application until after the classification is received. The classification is displayed with the SMS message. This provides a means of classifying an SMS message. The SMS application acts as bridge between the SMS and the IP communication protocols.

On advantage may be that SMS messages are able to be displayed using classifications or for triggering an alert. For example a particular SMS message may be classified as an emergency and trigger a sensory alert.

In another embodiment, the method further comprises a user interface. The SMS application is configured for displaying the message and the classification on the user interface using the display. For example the display may be a touch screen. In another embodiment, the text classification system is configured for generating an emergency classification. The user interface displays a user interface button next to the SMS message if the message classification is the emergency classification. The method further comprises the SMS application controlling the telecommunications device to send a response message to the content provider if the user interface button is activated.

The SMS message may have a sending telephone number. The SMS application may use the sending telephone number to generate a response address to send the response message to. In one example, the response address could be the sending telephone number directly and the SMS application sends the response message as an SMS message. In other examples the sending telephone number may be used to look up an email address or IP address in a look up table or directory. In either of these cases the response message could be sent as an email or other type of message via IP.

In another embodiment the mobile telecommunications device comprises a sensor that generates sensor data. The sensor data may be appended to the response message. For example the sensor could be a GPS receiver and location data could be appended to the response message. In another example the sensor could be a motion detectors such as a gyroscope or accelerometer that indicates motion or movement of the user of the mobile telecommunications device. Data which indicates if the phone is in motion could then be appended to the response message.

In another aspect the invention provides for a digital telecommunication system comprising a telecommunications device. The telecommunications device comprises a graphical display. The telecommunication system further comprises a digital mobile telecommunications network. The telecommunications device is configured for connecting to the digital mobile telecommunications network. The digital telecommunication system further comprises a wired digital network. The wired digital network is connected to the digital mobile telecommunications network. The digital telecommunication system further comprises a content provider. The wired digital network is connected to the content provider. The content provider is configured for providing the message. The message comprises at least a text portion. The digital telecommunication system further comprises a text classification system. The text classification system is connected to the wired digital network.

The digital telecommunication system is configured to request the message from the content provider by the telecommunications device. The digital telecommunication system is further configured to send the message to the telecommunications device by the content provider via the wired digital network and the digital mobile telecommunications network. The digital telecommunication system is further configured to receive the message by the telecommunications device via the digital mobile telecommunications network. The digital telecommunication system is further configured to send the message to the text classification system via the telecommunications device via the wired digital network and the digital mobile telecommunications network. The digital telecommunication system is further configured to receive the message by the text classification system via the wired digital network. The digital telecommunication system is further configured to create text tokens from the text portion using a tokenizing algorithm by the text classification system.

The digital telecommunication system is further configured to transform the text tokens into stem tokens using a stemming algorithm by the text classification system. The digital telecommunication system is further configured to determine a word classifier for each of the stem tokens using a named entity recognition algorithm by the text classification system. The digital telecommunication system is further configured to calculate a message classification of the message using a classification algorithm by the text classification system. The classification algorithm uses the stem tokens and the word classifier for each of the stem tokens as input. The digital telecommunication system is further configured to send the message classification to the telecommunications device by the text classification system via the wired network and the digital mobile telecommunications network. The digital telecommunication system is further configured to receive the message classification by the telecommunications device via the digital mobile telecommunications network. The digital telecommunication system is further configured to display the message on the screen. The displayed message is modified according to the classification. The advantages of this embodiment have been discussed previously.

In another embodiment the named entity recognition algorithm is any one of the following: a statistical classifier, a list-based recognition system, a grammar-based system, and combinations thereof. The advantages of this embodiment have been previously discussed.

In another embodiment the text classification system is a database system. The advantages of this embodiment have been previously discussed.

In another embodiment the classification algorithm is a naive Bayesian classifier or a neural network. The advantages of this embodiment have been previously discussed.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD), Digital Versatile Disks (DVD), and Blu-Ray Disc (BD), for example CD-ROM, CD-RW, CD-R, DVD-ROM, DVD-RW, DVD-R, BD-R, or BD-RE disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further under stood that, when not mutually exclusive, blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is understood that one or more of the aforementioned embodiments of the invention may be combined as long as the combined embodiments are not mutually exclusive.

BRIEF DESCRIPTION OF THE DRAWINGS

In the following embodiments of the invention are explained in greater detail, by way of example only, making reference to the drawings in which:

FIG. 9 shows a flow chart which shows various actions performed by the telecommunications device, the content provider, and the text classification system.

DETAILED DESCRIPTION

Like numbered elements in these figures are either equivalent elements or perform the same function. Elements which have been discussed previously will not necessarily be discussed in later figures if the function is equivalent.

Figure 1:
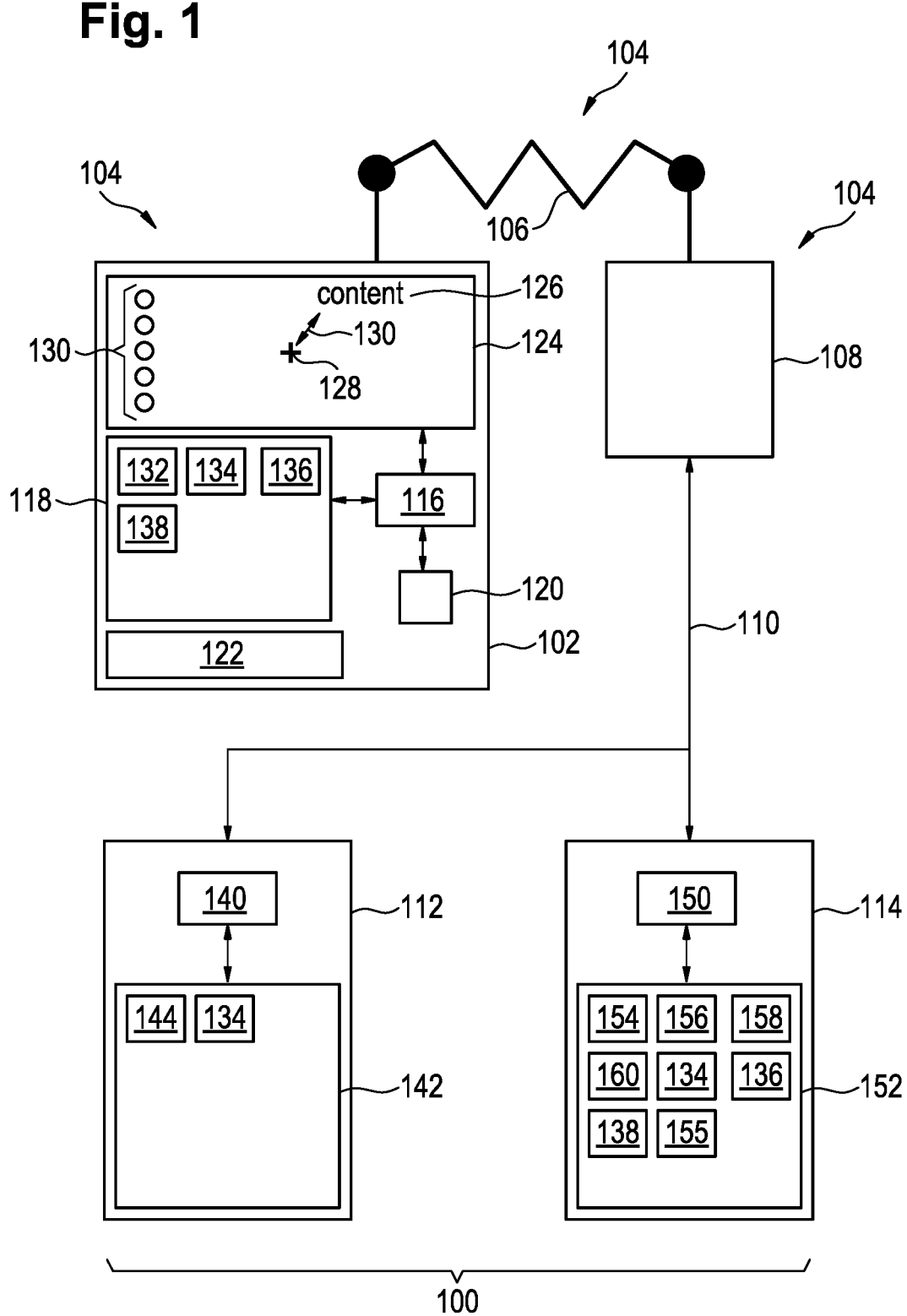
FIG. 1 illustrates an example of a digital telecommunications system.

FIG. 1 shows an example of a digital telecommunication system 100. The digital telecommunication system comprises a telecommunications device 102. The telecommunications device 102 is part of a digital telecommunications network 104 that is formed by the telecommunications device 102, a base station 108 and a wireless digital communication channel 106 that allows communication between the two. The base station 108 is shown as being connected to a wired digital network 110 that is also connected to a content provider 112 and a text classification system 114.

The telecommunications device 102 is shown as comprising a processor 116 that is connected to a memory 118. The processor 116 is also optionally connected to a transducer 120 that could for example produce vibrations or sound. The processor 116 is further connected to a display 124. The display 124 could for example be a touch sensitive display. The telecommunications device 102 is shown as optionally comprising a battery 122.

The display 124 is shown as displaying a message 126. The message 126 is a rendering of the message. The display 124 has a center point 128. In some examples the message 126 is displayed at a distance 130 determined by the message classification. In some examples the font size of the message 126 is determined by a message classification. The display 124 is also shown as containing a user interface object 130.

The memory 118 is shown as containing an operating system 132 that enables the processor 116 to function and control the telecommunications device 102. The memory 118 is further shown as containing a message 134 that was received via the wireless communication channel 106 from the content provider 112. The memory 118 is further shown as containing a message classification 136 that was received via the wireless digital communication channel 106 from the text classification system 114. The message classification 136 may for example be used to modify the distance 130, control whether the transducer 120 is activated or in what amounts in some examples. The message classification 136 may also be used to determine the font size of the message 126. The message 126 is a rendering of the message 134. In some examples the user interface object 130 may be used to select a user selected classification 138 which is shown as being stored in the memory 118. The user selected classification 138 may be sent to the text classification system 114.

The content provider 112 is shown as containing a processor 140. The processor 140 is connected to a memory 142 which contains a content server 144. The content server 144 is for example a program which responds to a request to send a text message or other content out via the wired network 110. The content server 114 could for example be a server, an email or messaging system, or a database which responds to a query to provide data or information. The message 134 is shown in the memory 142.

The text classification system 114 is shown as also containing a processor 150 that is connected to a memory 152. The memory 152 contains a tokenizing algorithm 154 for generating text tokens from the text portion of the message 134. The memory 152 further contains stemming algorithm a stemming algorithm 155 that is used to stem the text tokens. The memory 152 is further shown as containing a named entity recognition algorithm 156 for generating word classifiers for each token generated from the message 134. The memory 152 is further shown as containing a classification algorithm 158 for generating the message classification 136 from the tokens and their classification. The memory 152 is shown as optionally containing a classification algorithm 158 for training or modifying the classification algorithm 158. The memory 152 is shown as containing the message 134, the message classification 136, and optionally the user selected classification 138.

Figure 2:
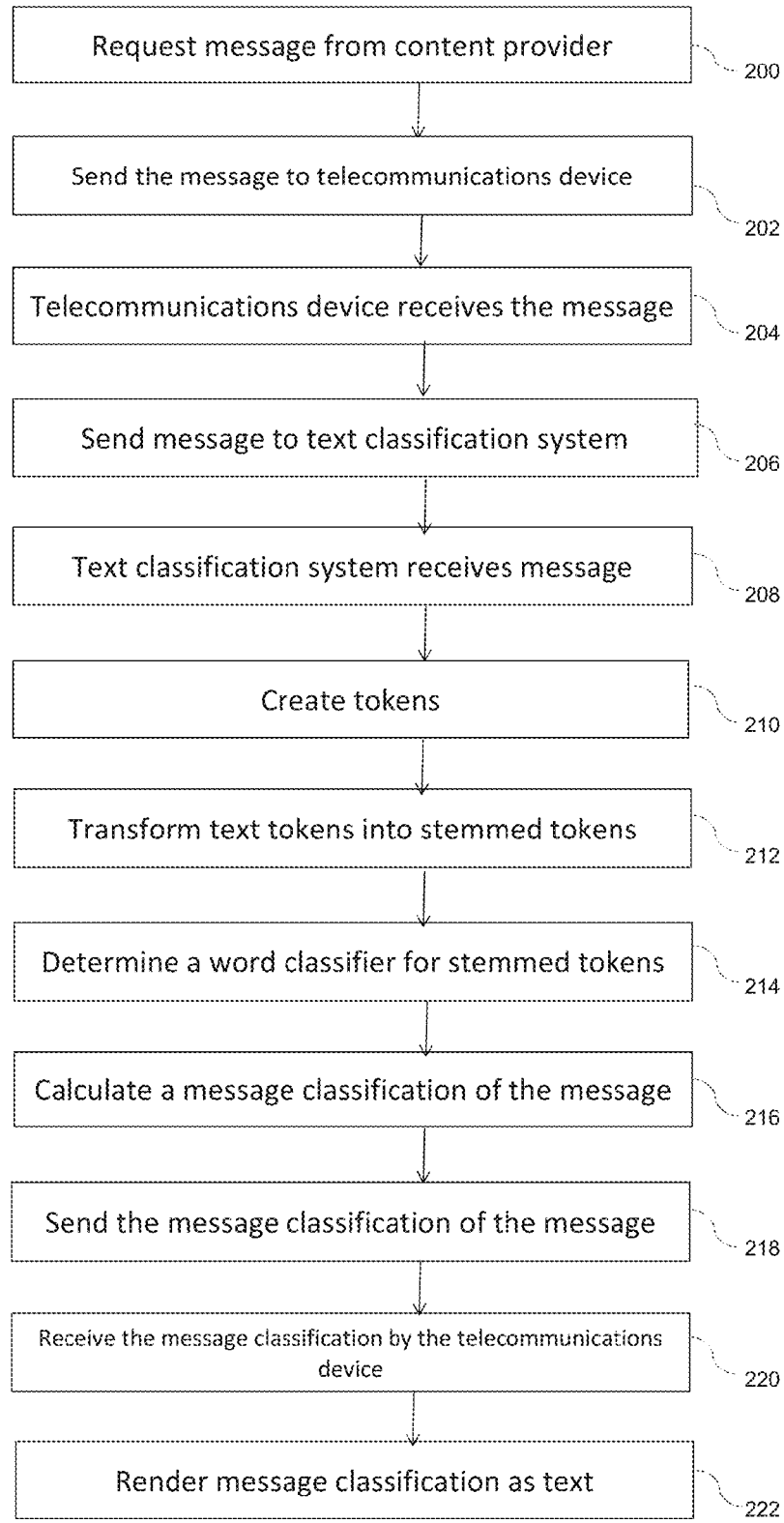
FIG. 2 shows a block diagram which illustrates a method of using the system of FIG. 1.

FIG. 2 shows a flow diagram which illustrates a method of operating the digital telecommunication system 100 of FIG. 1. First in step 200 the telecommunications device 102 requests the message 134 from the content provider 112 via the digital telecommunications network 104 and the wired digital network 110. Next in step 202 the content provider 112 sends the message 134 to the telecommunications device via the wired digital network 110 and the digital telecommunications network 104. In step 206 the telecommunications device 102 receives the message 134 via the digital mobile telecommunications network 104. Next in step 206 the telecommunications device 102 sends the message 134 to the text classification system 114 via the digital telecommunications network 104 and the wired digital network 110. In step 208 the text classification system 114 receives the message 134 via the wired digital network 110. In step 210 the processor 150 of the text classification system 114 creates tokens from the text portion of the message 136 using a tokenizing algorithm 153.

In step 212 the processor 150 of the text processing system 114 transforms the text tokens into stemmed tokens using a stemming algorithm 155. Next in step 214 the processor 150 of the text classification system 114 determines a word classifier for each of the stemmed tokens using a named entity recognition algorithm 156. Next in step 216 the processor 150 of the text classification system 114 calculates the message classification 136 for the message 134 using a classification algorithm 158. The classification algorithm 158 uses the stemmed tokens and the word classifier for each of the stem tokens as input. Next in step 218 the text classification system 114 sends the message classification 136 to the telecommunications device 102 via the wired digital network 110 and the digital telecommunications network 104. Next in step 220 the telecommunications device 102 receives the message classification 136 via the digital mobile telecommunications network 104. Finally in step 222 the processor 116 of the telecommunications device 102 renders the message classification as the text 126 on the display 124. The rendering of the text 126 is controlled by the message classification 136. For example the distance 130 and the font of the text 126 could be altered. The duration of time that the text 126 is displayed on the display 124 could be modified also.

Figure 3:
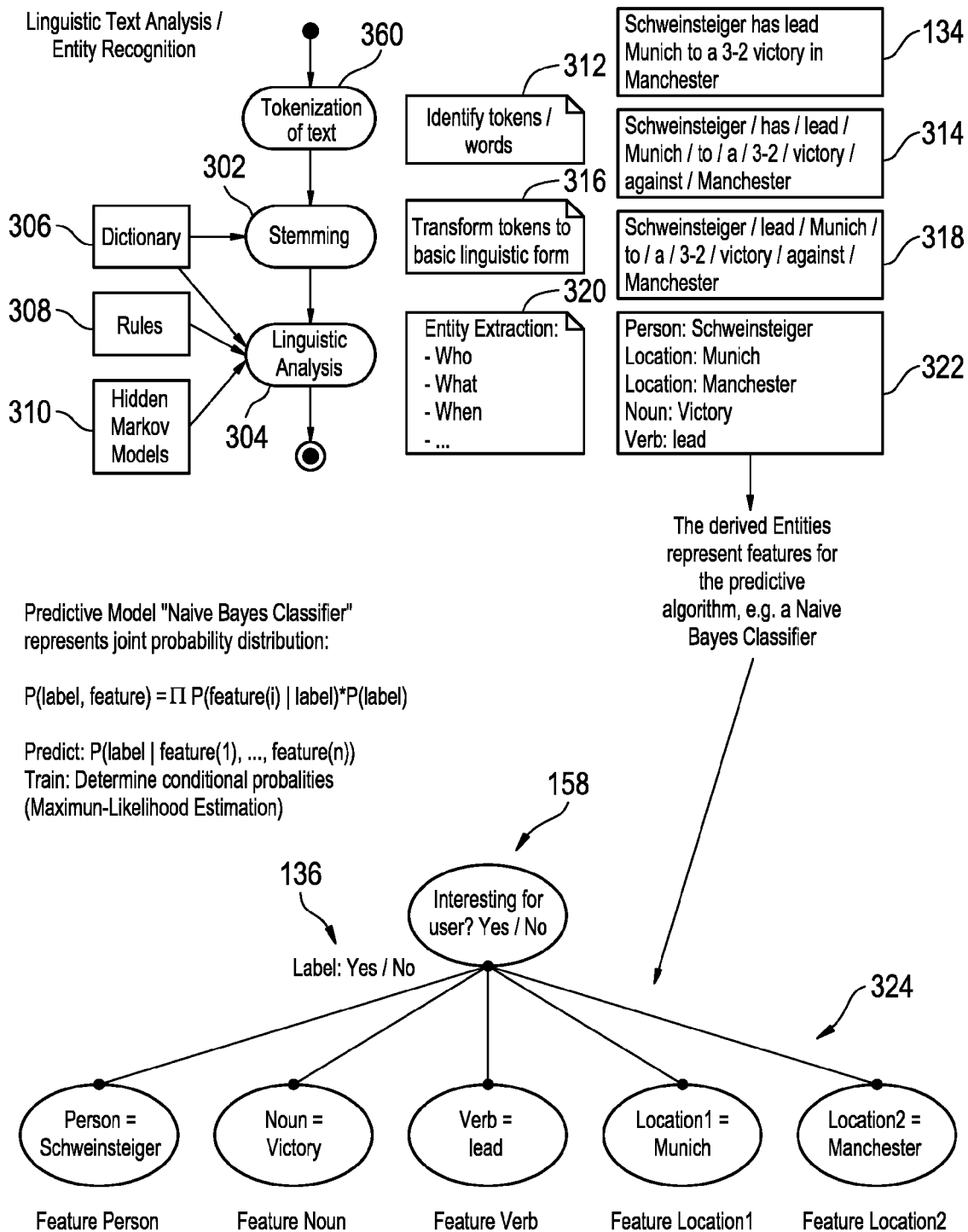
FIG. 3 shows a figure illustrates one method of performing the message classification.

FIG. 3 shows a figure which explains one method of performing the message classification. The flowchart 300 shows the linguistic and text analysis. First in step 300 the text is tokenized. Next in step 302 it is stemmed. Then finally a linguistic analysis 304 is performed. The stemming and the linguistic analysis may use a dictionary. In step 304 rules and/or a hidden Markov model 310 may be used for the linguistic analysis. The hidden Markov model 310 is representative of statistical models or methods in general.

The text to the right labeled 134 shows an example of a simple message 134. The step 300 corresponds to identifying tokens or words 312. The box 314 shows the message 134 broken into tokens. Step 302 corresponds to transforming 316 tokens into the basic linguistic form. 318 shows an example of the text in box 314 that has been stemmed. The linguistic analysis 304 may be a form of entity extraction 320 which answers such questions who, what, where and when and classifies various nouns or verbs. The box 322 shows a classification for a number of the words 318. The derived entities represent features for a predictive or classification algorithm for example a naive Bayesian classifier. The stemmed tokens 318 and the classifications 322 are then sent to a message classification algorithm 158. In this example it may be a naive Bayesian classifier. The tokens 318 and the classification 322 can be constructed into a vector 324 as used as an input for the message classification algorithm 158. This may then provide a message classification 136. The addition of the word classifiers 322 enables the message classification algorithm 158 to provide the classification 136 for much shorter messages than is normally possible.

Figure 4:
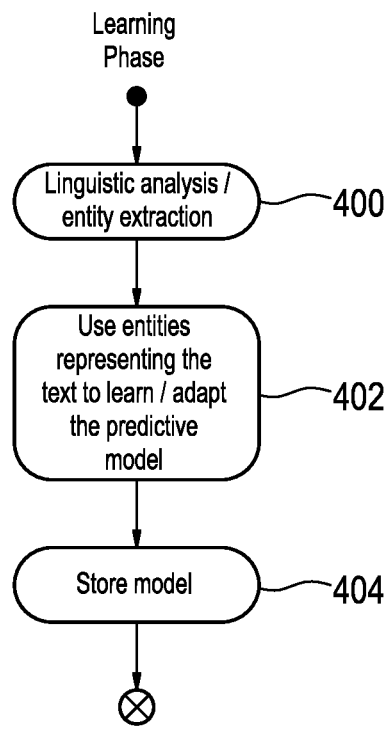
FIG. 4 shows a flowchart of a learning phase for the classification algorithm.

FIG. 4 shows a flowchart of a learning phase for the classification algorithm. In step 400 a linguistic analysis and/or entity extraction is performed. Next in step 402 the entities representing the text are used to learn or to adapt a predictive model such as a naive Bayesian classifier or a neural network. And finally in step 404 the model is stored.

Figure 5:
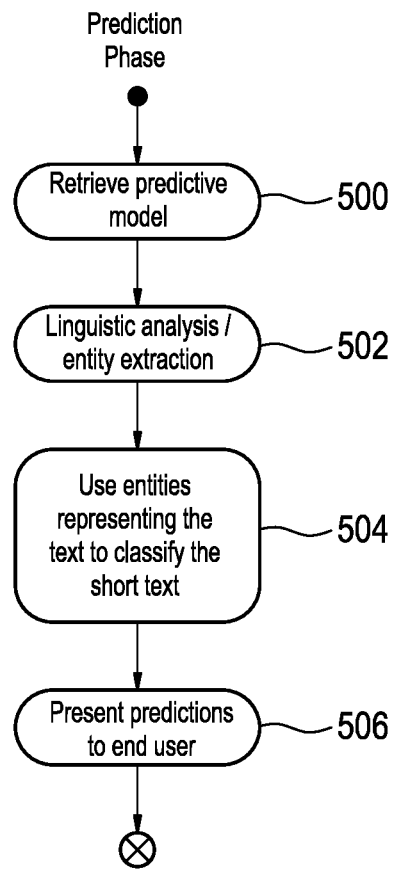
FIG. 5 shows a flowchart, which illustrates the use of a predictive model or classification algorithm for classifying the message.

FIG. 5 shows a flowchart which illustrates the use of a predictive model or classification algorithm for classifying the text. First in step 500 the predictive model is retrieved. Next in step 502 the linguistic analysis or entity extraction 502 is performed. Next in step 504 the entities representing the text are used to classify the short text or the text portion of the message. Finally in step 506 the predictions are presented to the end user. In this case the display of the message 126 has its display modified on the telecommunications device 102 of FIG. 1.

Figure 6:
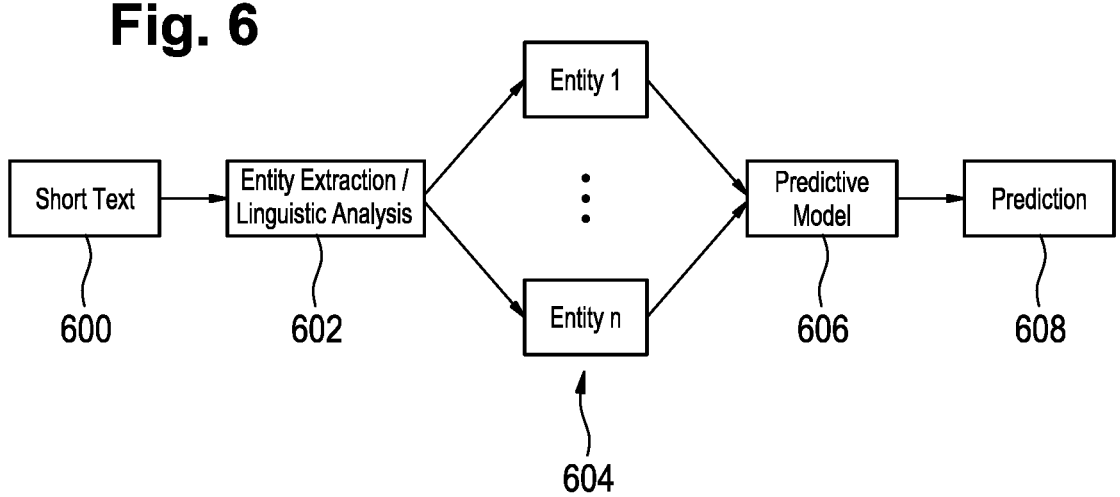
FIG. 6 shows a further flowchart which illustrates the method of classifying the message.

FIG. 6 shows a further flowchart which illustrates the method of classifying the message 134. First in step 600 the short text is received. Next in step 602 the entity extraction and linguistic analysis is performed. This generates a list of entities 604. These are labeled 1-$n$ in FIG. 6. These are then paired with the stemmed text and fed into the predictive model 606 which then provides the prediction 608 or the classification 136 as shown in FIG. 1.

Figure 7:
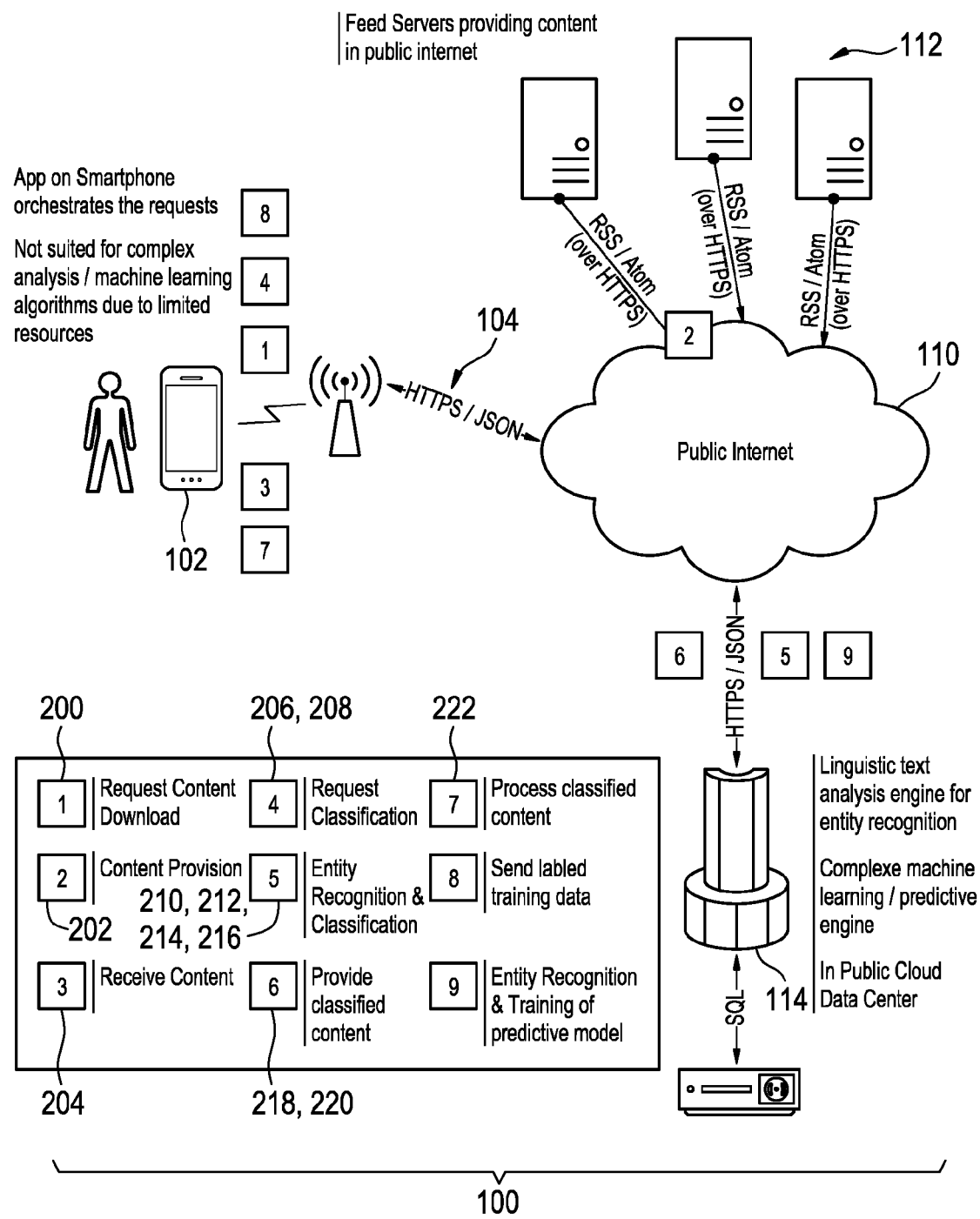
FIG. 7 shows a functional diagram of a digital telecommunications system.

FIG. 7 shows a functional diagram of the digital telecommunications system 100 of FIG. 1 shown differently. The blocks labeled 1-9 correspond to different steps in the method detailed in FIG. 2. Block 1 is labeled request content download. This corresponds to block 200 of FIG. 2. Block 2 is labeled content provision. This corresponds to block 202 of FIG. 2. Block 3 is labeled received content. Block 3 corresponds to block 204 of FIG. 2. Block 4 is labeled request classification. This corresponds to blocks 206 and 208 of FIG. 2. Block 5 is labeled entity recognition classification. Block 5 corresponds to blocks 210, 212, 214 and 216 of FIG. 2. Block 6 is labeled provide a classified content. Block 6 corresponds to blocks 218 and 220 of FIG. 2. Block 7 is labeled process classified content. Block 7 corresponds to block 222 of FIG. 2. Block 8 is labeled sending labeled training data. The sending labeled training data corresponds to receiving data with the user interface object 130 of FIG. 1 to generate the user selected classification 138. The block labeled 9 represents the entity recognition and training of the predictive model corresponds to sending the user selected classification 138 to the text classification system 114 for the training algorithm 160 to modify the message classification algorithm 158.

Figure 8:
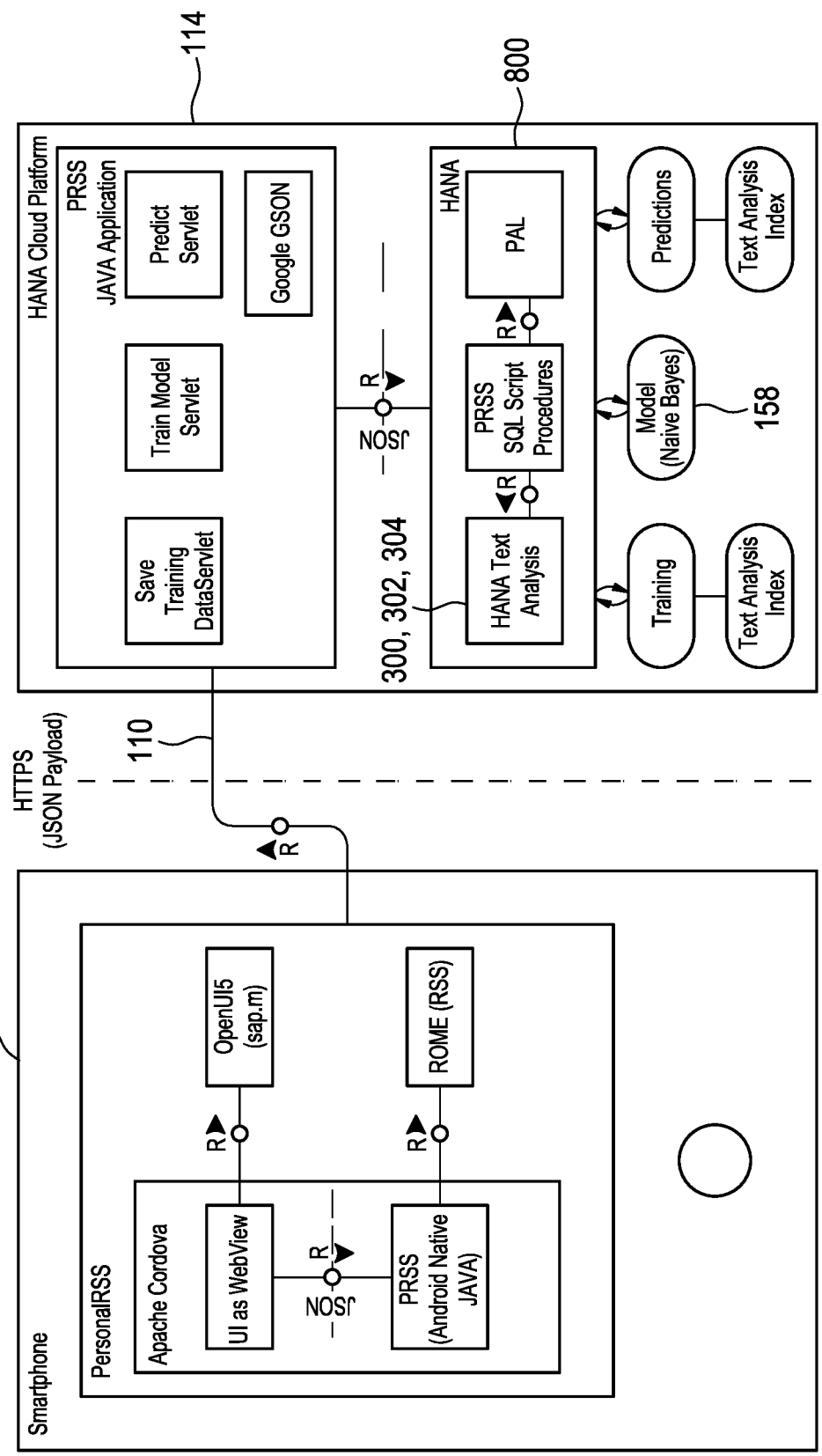
FIG. 8 shows a further example of an implementation of a telecommunications device and a text classification system.

FIG. 8 shows a further example of an implementation of the telecommunications device 102 and the text classification system 114. In this example the telecommunications device 102 is a smart phone. This is connected to a database management system 114 via a wired digital network 110 such as the internet. In this example the PRSS Java application is used as an interface to the personal IRSS running on the Smartphone. The PRSS Java application then interfaces with the HANA database system which is produced by SAP Incorporated. The HANA database system 800 then uses its text analysis portions to process the text and provide the classification 136.

FIG. 9 shows a chart which shows various actions performed by the telecommunications device 102, the content provider 112, and the text classification system 114. First in step 900 the mobile phone or telecommunications device accesses a short text 900. Next the content provider 112 provides short texts 902. The short text is then sent to the mobile phone 102. The mobile phone 904 then forwards the short text to the classification system 114. The text classification system then receives the short text 906. Then it analyzes the short text linguistically 908. In step 910 it retrieves a predictive model based on linguistic features 910. Next in step 912 it classifies or scores the relevance of the short text. Then in step 914 the text classification system 114 provides a short text with the relevance and classification score 914. This short text is then sent to the telecommunications device 102. In step 916 the telecommunications device 102 receives the classified short text. Then in step 918 the telecommunications device labels the relevance of the short text. Next in step 920 the telecommunications device 102 forwards the labeled short text back to the text classification system 114. In step 922 the text classification system 114 receives the short labeled text. In step 924 the text classification system 114 analyzes the labeled short text linguistically in 924. Then finally in step 926 the text classification system 114 trains or adapts the predictive model to improve the text classification. The method then returns back to step 900 where the telecommunications device access more short texts.

LIST OF REFERENCE NUMERALS 1 request content download
2 content provision
3 receive content
4 request classification
5 entity recognition and classification
6 provide classified content
7 process classified content
8 send labeled training data 9 entity recognition and training of predictive model
100 digital telecommunications system
102 telecommunications device
104 digital telecommunications network
106 wireless digital communication channel
108 base station
110 wired digital network
112 content provider
114 text classification system
116 processor
118 memory
120 transducer
122 battery
124 display
126 message
128 center of display
130 distance
130 user interface object
132 operating system
134 message
136 message classification
138 user selected classification
140 processor
142 memory
144 content server
150 processor
152 memory
154 tokenizing algorithm
155 stemming algorithm
156 named entity recognition algorithm
158 message classification algorithm
160 training algorithm
200 requesting the message from the content provider by the telecommunications device
202 send the message to the telecommunications device by the content provider via the wired digital network and the digital mobile telecommunications network
204 receiving the message by the telecommunications device via the digital mobile telecommunications network
206 send the message to the text classification system by the telecommunications device via the wired digital network and the digital mobile telecommunications network
208 receive the message by the text classification system via the wired digital network
210 create text tokens from the text portion using a tokenizing algorithm by the text classification system
212 transform the text tokens into stemmed tokens using a stemming algorithm by the text classification system;
214 determine a word classifier for each of the stemmed tokens using a named entity recognition algorithm by the text classification system
216 calculate a message classification of the message using a classification algorithm by the text classification system
218 send the message classification to the telecommunications device by the text classification system via the wired network and the digital mobile telecommunications network
220 receive the message classification by the telecommunications device via the digital mobile telecommunications network
222 display the message on the screen, wherein the display of the message is modified according to the classification.
300 tokenization of text
302 stemming
304 linguistic analysis
306 dictionary
308 rules
310 hidden Markov models
312 identify tokens
314 example of tokens
316 transform tokens to basic linguistic form (stemming)
318 example of stemmed words
320 entity extraction (word classifier)
322 example of word classifiers
324 vector
400 linguistic analysis/entity extraction
402 use entities representing the text to learn/adapt the predictive model
404 store model
500 retrieve predictive model
502 linguistic analysis/entity extraction
504 use entities representing the text to classify the short text
506 present predictions to the end user
600 short text
602 entity extraction/linguistic analysis
604 entities 1 through n
606 predictive model
608 prediction
700 send labeled training data
702 entity recognition and training of predictive model
800 database system
900 access short texts
902 provide short texts
904 forward short texts
906 receive short texts
908 analyze short texts linguistically
910 retrieve predictive model based on linguistic features
912 classify/score relevance of short texts
914 provide short texts with relevance classification/score
916 receive classified shorts texts
918 read and label relevance of short texts
920 forward labeled short texts
922 receive labeled short texts
924 analyze labeled shorts text linguistically
926 train/adapt predictive model

The invention claimed is:

1. A digital mobile telecommunications method comprising:
sending, by a content provider server, to a telecommunications device, via a digital mobile telecommunications network, a message, wherein the telecommunications device comprises a graphical display, wherein the telecommunications device is configured for connecting to the digital mobile telecommunications network, and wherein the message comprises at least a text portion;
receiving the message by the telecommunications device via the digital mobile telecommunications network;
sending, by the telecommunications device, the message to a text classification system via a wired digital network and a digital mobile telecommunications network, wherein the wired digital network is connected to the digital mobile telecommunications network, to the content provider server, and to the text classification system;
receiving, by the text classification system, via the wired digital network, the message;
creating text tokens from the text portion, using a tokenizing algorithm stored in a memory device, by the text classification system;

transforming, by the text classification system, based on a stemming algorithm stored in a memory device, the text tokens into stemmed tokens;

determining, by the text classification system, based on a named entity algorithm stored in a memory device, a word classifier for each of the stemmed tokens;

calculating, by the text classification system, based on a classification algorithm stored in a memory device, a message classification of the message, wherein inputs to the classification algorithm stored in the memory device are the stemmed tokens and the determined word classifier for each of the stemmed tokens;

sending, by the text classification system, to the telecommunications device, the message classification via the wired network and via the digital mobile telecommunications network;

receiving, by the telecommunications device, the message classification via the digital mobile telecommunications network; and displaying, by the telecommunications device, the message on the display, wherein the displaying of the message is modified according to the message classification.

2. The digital mobile telecommunications method of claim 1, wherein the named entity recognition algorithm stored in a memory device is any one of the following: a statistical classifier, list based recognition system, a grammar based system, and combinations thereof.

3. The digital mobile telecommunications method of claim 1, wherein the text classification system is a database system.

4. The digital mobile telecommunications method of claim 1, wherein the classification algorithm stored in a memory device is a naive Bayesian classifier or a neural network.

5. The digital mobile telecommunications method of claim 1, wherein the method further comprises displaying the message on the graphical display for a display duration determined by the classification.

6. The digital mobile telecommunications method of claim 1, wherein the method further comprises displaying the message on the graphical display using a font, wherein the font has a sized determined by the classification.

7. The digital mobile telecommunications method of claim 1, wherein the graphical display has a center, wherein the method further comprises displaying the message on the graphical display a selected distance from the center, wherein the selected distance is determined by the message classification.

8. The digital mobile telecommunications method of any one of claim 1, wherein the method further comprises: displaying a user interface object on the graphical display, wherein the graphical display is configured for being manipulated to indicate a user selected message classification; receiving the user selected message classification from the graphical display; sending the user selected message classification by the telecommunications device to the text classification system via the digital mobile telecommunications network and the wired network; receiving the user selected message classification by the text classification system via the wired network; and training the classification algorithm stored in a memory device by the text classification system using the text portion and the user selected message classification.

9. The digital mobile telecommunications method of claim 1, wherein the text portion using a tokenizing algorithm stored in a memory device is any one of the following: wherein the text portion is less than 40 words, wherein the text portion is less than 20 words, wherein the text portion is less than 10 words, wherein the text portion is less than 6 sentences, wherein the text portion is less than 4 sentences, and wherein the text portion is less than 2 sentences.

10. The digital mobile telecommunications method of claim 1, wherein the telecommunications device is configured for providing a sensory alert, and wherein the sensory alert is determined by the message classification.

11. The digital mobile telecommunications method of claim 10, wherein the sensory alert is any one of the following: an audible alert, a vibrating alert, a flashing alert on the graphical display, and combinations thereof.

12. The digital mobile telecommunications method of claim 1, wherein the method further comprises requesting the message from the content provider server by the telecommunications device, and wherein the message to the telecommunications device by the content provider server is sent via the wired digital network and the digital mobile telecommunications network.

13. The digital mobile telecommunications method of claim 1, wherein the message is sent to the telecommunications device as an SMS message via a signaling layer of the digital mobile telecommunications network, wherein the telecommunications device receives the SMS message using an SMS application stored in a memory device, wherein the SMS message is sent to the text classification system via IP protocol via the digital mobile telecommunications network by the SMS application stored in a memory device, wherein the SMS message is displayed by the SMS application stored in a memory device only after receiving the classification, wherein the classification is displayed with the SMS message.

14. The digital mobile telecommunications method of claim 13, wherein the method further comprises a user interface, wherein the SMS application stored in a memory device is configured for displaying the SMS message and the classification on the user interface using the display, wherein the text classification system is configured for generating an emergency classification, wherein the user interface displays a user interface button next to the SMS message if the SMS message classification is the emergency classification, wherein the SMS message has a sending telephone number, wherein the method further comprises the SMS application stored in a memory device controlling the telecommunications device to send a response message to the content provider server if the user interface button is activated using the sending telephone number.

15. A digital telecommunications system comprising:
a telecommunications device, wherein the telecommunications device comprises a graphical display;
a digital mobile telecommunications network, wherein the telecommunications device is configured for connecting to the digital mobile telecommunications network;
a wired digital network, wherein the wired digital network is connected to the digital mobile telecommunications network;
a content provider server, wherein the wired digital network is connected to the content provider server, wherein the content provider server is configured for providing a message, wherein the message comprises at least a text portion; and
a text classification system, wherein the text classification system is connected to the wired digital network;
wherein the digital telecommunications system is configured to:

send the message to the telecommunications device by the content provider server via the digital mobile telecommunications network;

receive the message by the telecommunications device via the digital mobile telecommunications network;

send the message to the text classification system by the telecommunications device via the wired digital network and the digital mobile telecommunications network;

receive the message by the text classification system via the wired digital network;

create, by the text classification system text tokens from the text portion using a tokenizing algorithm stored in a memory device;

transform, by the text classification system, the text tokens into stemmed tokens using a stemming algorithm stored in a memory device;

determine, by the text classification system, a word classifier for each of the stemmed tokens using a named entity recognition algorithm stored in a memory device;

calculate, by the text classification system, a message classification of the message using a classification algorithm stored in a memory device, wherein inputs to the classification algorithm stored in the memory device are the stemmed tokens and the word classifier for each of the stemmed tokens;

send, by the text classification system, the message classification to the telecommunications device via the wired network and via the digital mobile telecommunications network;

receive the message classification by the telecommunications device via the digital mobile telecommunications network; and display the message on the display, wherein the display of the message is modified according to the classification.

16. The digital telecommunications system of claim 15, wherein the named entity recognition algorithm stored in a memory device is any one of the following: a statistical classifier, list based recognition system, a grammar based system, and combinations thereof.

17. The digital telecommunications system of claim 15, wherein the text classification system is a database system.

18. The digital telecommunications system of claim 15, wherein the classification algorithm stored in a memory device is a naive Bayesian classifier or a neural network.

* * * * *